C. SMITH.
WRENCH.
APPLICATION FILED JULY 11, 1911.
1,096,763.
Patented May 12, 1914.
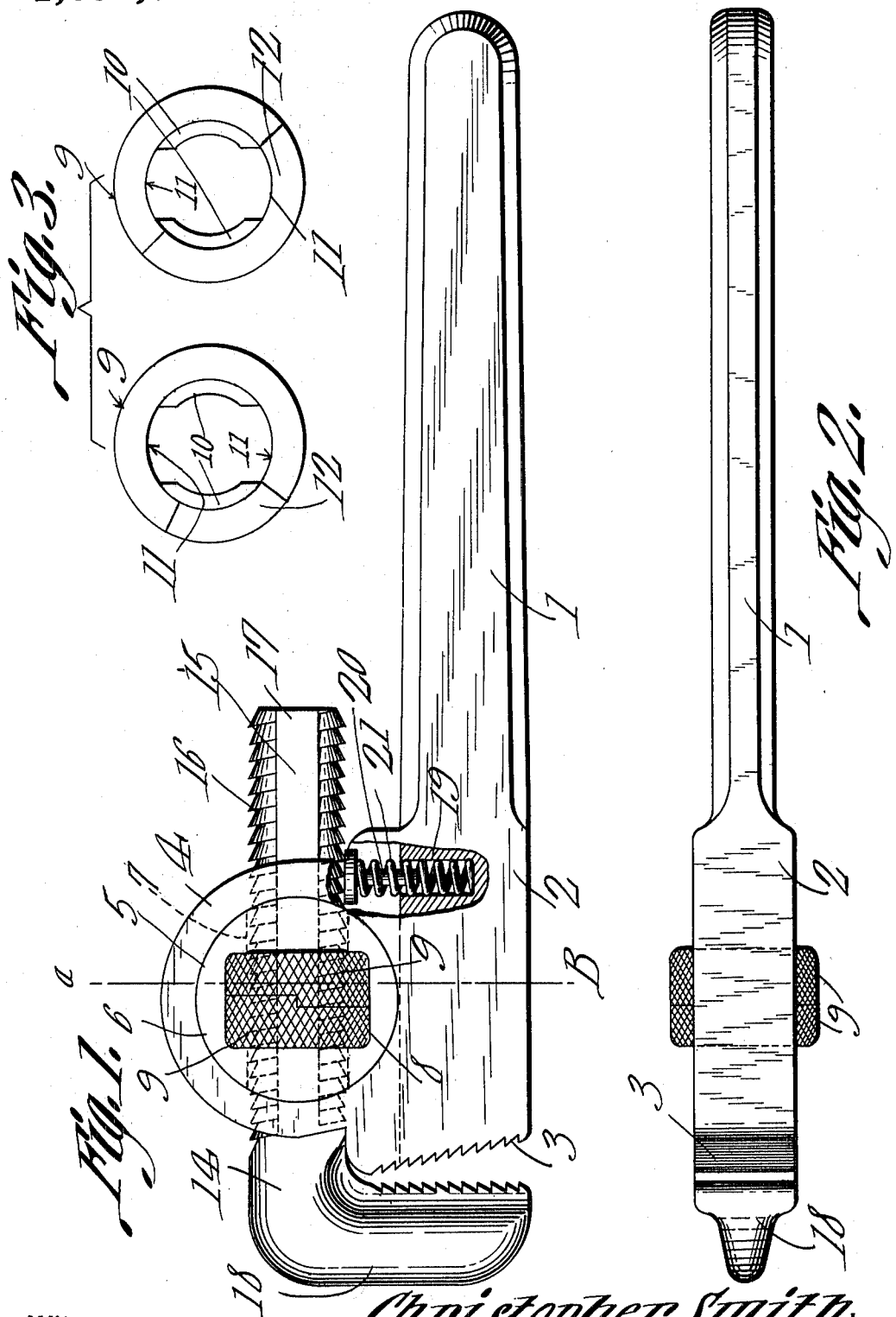
Christopher Smith Inventor
by C. A. Snow & Co.
Attorneys
Witnesses

UNITED STATES PATENT OFFICE.

CHRISTOPHER SMITH, OF ORRVILLE, OHIO.

WRENCH.

1,096,763.

Specification of Letters Patent. Patented May 12, 1914.

Application filed July 11, 1911. Serial No. 637,967.

*To all whom it may concern:*

Be it known that I, CHRISTOPHER SMITH, a citizen of the United States, residing at Orrville, in the county of Wayne and State of Ohio, have invented a new and useful Wrench, of which the following is a specification.

It is the object of the present invention to provide a quick-acting pipe wrench, in which novel means are provided for effecting a rapid shifting of the movable jaw, means being provided for holding the movable jaw at its adjusted positions, and for giving to the movable jaw, after it has been set approximately, a further movement to engage with the work.

A further object of the invention is to provide novel means for mounting the movable jaw, both for longitudinal sliding movement and tiltably, and to provide novel means for actuating the movable jaw to engage the work.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a side elevation, parts being broken away; Fig. 2 is an edge elevation; and Fig. 3 is an elevation showing the abutting faces of the adjusting nuts.

The wrench herein disclosed comprises, as a primary and fundamental element, a shank 1, broadened adjacent one end, as shown at 2, the outer edge of the broadened portion 2 of the shank being serrated, to form a fixed jaw 3.

Adjacent the fixed jaw 3, the shank 1 is provided with spaced, parallel ears 4, preferably, although not necessarily, formed integrally with the shank 1. The ears 4 are supplied with openings 5, in which is journaled for rotation, a head 6, the head 6 having an opening 7 therethrough, which opening 7 is located between the ears 4, and is parallel to them. In the head 6 there is another opening 8, at right angles to the opening 7, and at right angles to the planes of the ears 4.

The invention further includes a pair of nuts, denoted by the numeral 9, the nuts 9 being threaded internally, as shown at 10. Parts of the threaded portions 10 of the nuts 9 are cut-away, so as to define channels 11 through the nuts. In their meeting faces, the nuts 9 are supplied with interengaging shoulders 12.

The nuts 9 are adapted to be placed edgewise in the opening 8 of the head 6, the openings through the nuts, under such circumstances, being alined with the opening 7 through the head. The nuts, when thus positioned, are adapted to receive a jaw-carrying member 14, consisting of a shank 15, of unequal transverse dimensions. The narrower edge faces of the shank 15 are threaded, as shown at 16, to engage with the threaded portions 10 of the nuts 9. The wider edge faces of the shank 15 are smooth, as shown at 17. The shank 15 carries at its outer end, a serrated movable jaw 18, adapted to coöperate with the fixed jaw 3.

In the shank 1 there is a recess 19, into which extends a pin 20, bearing against the shank 15 of the jaw-carrying member 14. Seated in the recess 19, and engaged with the pin 20, is a spring 21.

The split nut 9 may be replaced by the ordinary single nut with either a continuous or interrupted thread.

Suppose that it is desired to adjust the movable jaw 18 quickly. Under such circumstances, the shoulders 12 of the nuts 9 are brought into abutment. When the shoulders 12 are thus in abutment, the channels 11 of the nuts will be alined. The alined channels 11 are then alined with the longer transverse dimensions of the shank 15. Under such circumstances, the shank 15 may be moved longitudinally in the opening 7 of the head 6, and in the channels 11 of the nuts 9, the threaded portions 10 of the nuts 9 being out of engagement with the shank. The movable jaw 18 is then brought into close relation with the work, whereupon, by rotating one or both of the nuts 9, the threads 10 of the nuts 9 will be brought into engagement with the threads 16 of the shank 15, the jaw 18 being set firmly against the work, and being there held by the interengagement between the threads of the nuts and of the threads of the shank 15.

Owing to the fact that the head 6 is mounted for rotation in the openings 5 of the ears 4, it is obvious that the head, together with the jaw-carrying member 14 may be tilted, to alter the angle between the jaws 18 and 3. The spring 21, thrusting the pin 20 against the jaw-carrying members 14, serves to hold the movable jaw 18 yieldingly against the work, the coöperating between the pin 20 and the recess 19 being such that the spring 21 cannot become unseated. As will be evident from an inspection of the drawings, the milled peripheries of the nuts 9 are accessible readily, through the openings 5 in the ears 4.

Having thus described the invention, what is claimed is:—

A wrench comprising a shank having a fixed jaw; a head carried by the shank and provided with an opening; a movable jaw including a shank slidable in the head and threaded upon its opposite edges; superposed nuts held in the opening and threaded to engage the threads of the shank, parts of the threads of the nuts being cut away to permit a sliding of the shank in the nuts, the nuts being independently rotatable and being provided upon their inner end faces with outstanding shoulders projecting in opposite directions, the side faces of the shoulders being adapted to coact to aline the cutaway portions of the threads of the nuts, each nut lying outside of the contour of the other nut whereby one nut may be rotated without actuating the other nut until the side faces of the shoulders come into contact.

In testimony that I claim the foregoing as my own, I have hereto affixed my signature in the presence of two witnesses.

CHRISTOPHER SMITH.

Witnesses:
A. J. HELLER,
F. E. WOLFE.